United States Patent [19]

Bryan

[11] Patent Number: 5,243,634
[45] Date of Patent: Sep. 7, 1993

[54] DNB PERFORMING SPACER GRIDS

[75] Inventor: William J. Bryan, Granby, Conn.

[73] Assignee: Combustion Engineering, Inc., Windsor, Conn.

[21] Appl. No.: 905,478

[22] Filed: Jun. 29, 1992

[51] Int. Cl.$^5$ .............................................. G21C 3/34
[52] U.S. Cl. .................................. 376/439; 376/442; 376/438; 376/462
[58] Field of Search ............... 376/439, 438, 442, 441, 376/449, 462; 976/DIG. 76, DIG. 79; 428/116, 593; 211/60.1

[56] References Cited

U.S. PATENT DOCUMENTS

| | | | |
|---|---|---|---|
| 3,787,286 | 1/1974 | Anthony | 376/439 |
| 3,789,476 | 2/1974 | Ripley | 376/442 |
| 4,312,705 | 1/1982 | Steinke | 376/441 |
| 4,594,216 | 6/1986 | Feutrel | 376/442 |
| 4,775,510 | 10/1988 | Bryan | 376/443 |
| 4,832,999 | 5/1989 | Sweet | 428/116 |

FOREIGN PATENT DOCUMENTS 2155234A 9/1985 United Kingdom ............... 376/442

Primary Examiner—Donald P. Walsh
Assistant Examiner—Meena Chelliah
Attorney, Agent, or Firm—Chilton, Alix & Van Kirk

[57] ABSTRACT

A fuel assembly grid (10) in which the height dimension of the grid strips (A,B,C,D) varies along the strip length, so that channels or cells (24′,28) immediately surrounding the guide tube (30) define a relatively longer flow path, than channels that are relatively remote from the guide tube. In particular, the grids have a first plurality of four-walled first cells (24) for receiving and supporting respective fuel rods (26) and a second plurality of four-walled second cells (28) that are larger in cross-sectional area than, and interspersed among, the first cells, for receiving respective guide tubes (30). The improvement according to the present invention, provides that the height dimension (H2) of each strip (C) that defines walls of particular first and second cells is greater at the walls of the particular second cells, than at the walls of at least some of the particular first cells.

8 Claims, 7 Drawing Sheets

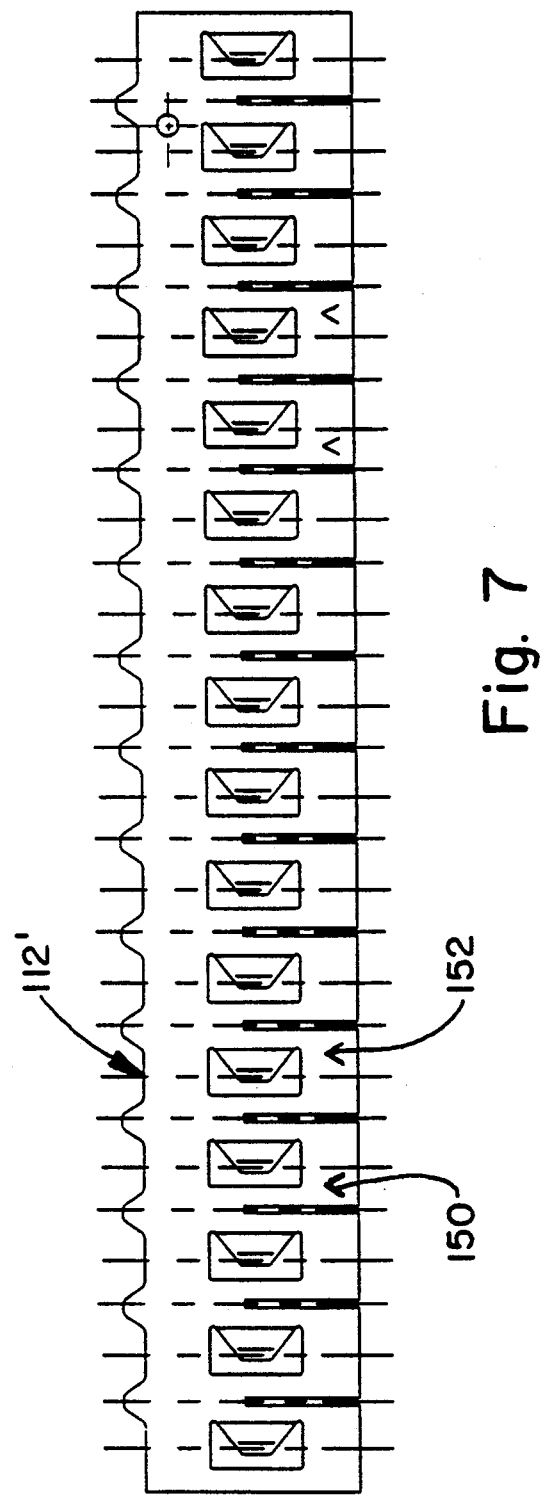

DNB PERFORMING SPACER GRIDS

BACKGROUND OF THE INVENTION

The present invention relates to nuclear fuel assemblies, and more particularly, to nuclear fuel assembly spacer grids.

In a light-water nuclear power reactor, a multiplicity of elongated nuclear fuel assemblies are supported in a close, side-by-side relationship. Heat generated in the fuel assembly is transferred to pressurized water, which flows longitudinally through the assemblies. Each assembly typically has a plurality of elongated support tubes to which are rigidly attached a plurality of longitudinally spaced apart, transversely oriented grids. The grids are typically formed by orthogonally oriented, metal strips interlaced in egg-grate fashion, so as to define an array of channels or cells. Fuel rods traverse the assembly through successive grids. The walls of each cell include fuel rods support structure, for maintaining the fuel rods in a predetermined, uniform spacing from each other, thereby optimizing the neutron physics and heat transfer within the assembly and the core as a whole.

Despite the ideal objective of minimizing the peak to average power ratio throughout the core, and the heat transferred to the coolant along the length of the "hottest" fuel rod, the geometry and heterogeneous nature of the core necessarily produces non-uniformities in flow and power generation. Such non-uniformities are particularly evident within each fuel assembly, immediately surrounding the guide or support tube, because such tube interrupts the regular array of fuel rods and the coolant flow cross-sectional area associated with the average rod. Moreover, the coolant flow surrounding the guide tube tends to be higher than the average coolant flow through the assembly, whereas the power generated in the channel or cell containing the guide tube, is zero, due to the absence of fuel therein.

Attempts have been made in the past to affect the coolant flow distribution surrounding the guide tube. In U.S. Pat. No. 3,787,286, issued Jan. 22, 1974 to Anthony, metal strips containing pre-punched tab projections are attached to at least some of the guide tubes, and include projections into the tube flow channel within the grid. U.S. Pat. No. 4,775,510 issued Oct. 4, 1988 to Bryan, describes a hollow flow deflector in the form of a sleeve which is attached to the guide tube at locations between the grids. Both flow deflecting structures described in these patents are attached directly to the guide tubes, and thus require additional fabrication steps during manufacture of the grids.

SUMMARY OF THE INVENTION

It is, accordingly, an object of the present invention to improve the thermal hydraulic performance of light-water nuclear fuel assemblies, by suppressing coolant flow immediately around the guide tube, thereby increasing the flow through the fuel rod channels. Also, channeling cooler coolant, which flows around the guide tube, into flow channels between fuel rods.

This is accomplished in one embodiment, by a fuel assembly grid in which the height dimension of the grid strips varies along the strip length, so that channels or cells immediately surrounding the guide tube define a relatively longer flow path, than channels that are relatively remote from the guide tube. In particular, the grids have a first plurality of four-walled first cells for receiving and supporting respective fuel rods and a second plurality of four-walled second cells that are larger in cross-sectional area than, and interspersed among, the first cells, for receiving respective guide tubes. The improvement according to the present invention, provides that the height dimension of each strip that defines walls of particular first and second cells is greater at the walls of the particular second cells, than at the walls of at least some of the particular first cells.

In another embodiment of the invention, the improvement provides that at least a portion of the walls of each of the larger, second cells, is bent over into the respective second cells, toward the support tube. Preferably, the walls of the second cells are vertically slit and a split portion of the wall is bent over into the second cell.

Thus, in accordance with the present invention, the pressure drop of the coolant flow through each grid is increased in the second cells, containing the guide tubes, thereby reducing the difference in the channel pressure drop between the first cells, which contain fuel rods, and the second cells. This has the effect of increasing the absolute flow rate through the first cells and the mixing of the coolant, thereby improving heat transfer and increasing the margin to departure from nuclear boiling (DNB).

BRIEF DESCRIPTION OF THE DRAWINGS

These and other objects and advantages of the invention will be set forth in greater detail below in connection with the description of the preferred embodiments, and reference to the accompanying drawings, in which:

FIG. 7 is an elevation view of one of the strips that define the walls of a support tube channel in the grid of FIG. 6.

DESCRIPTION OF THE PREFERRED EMBODIMENT

Figure 1:
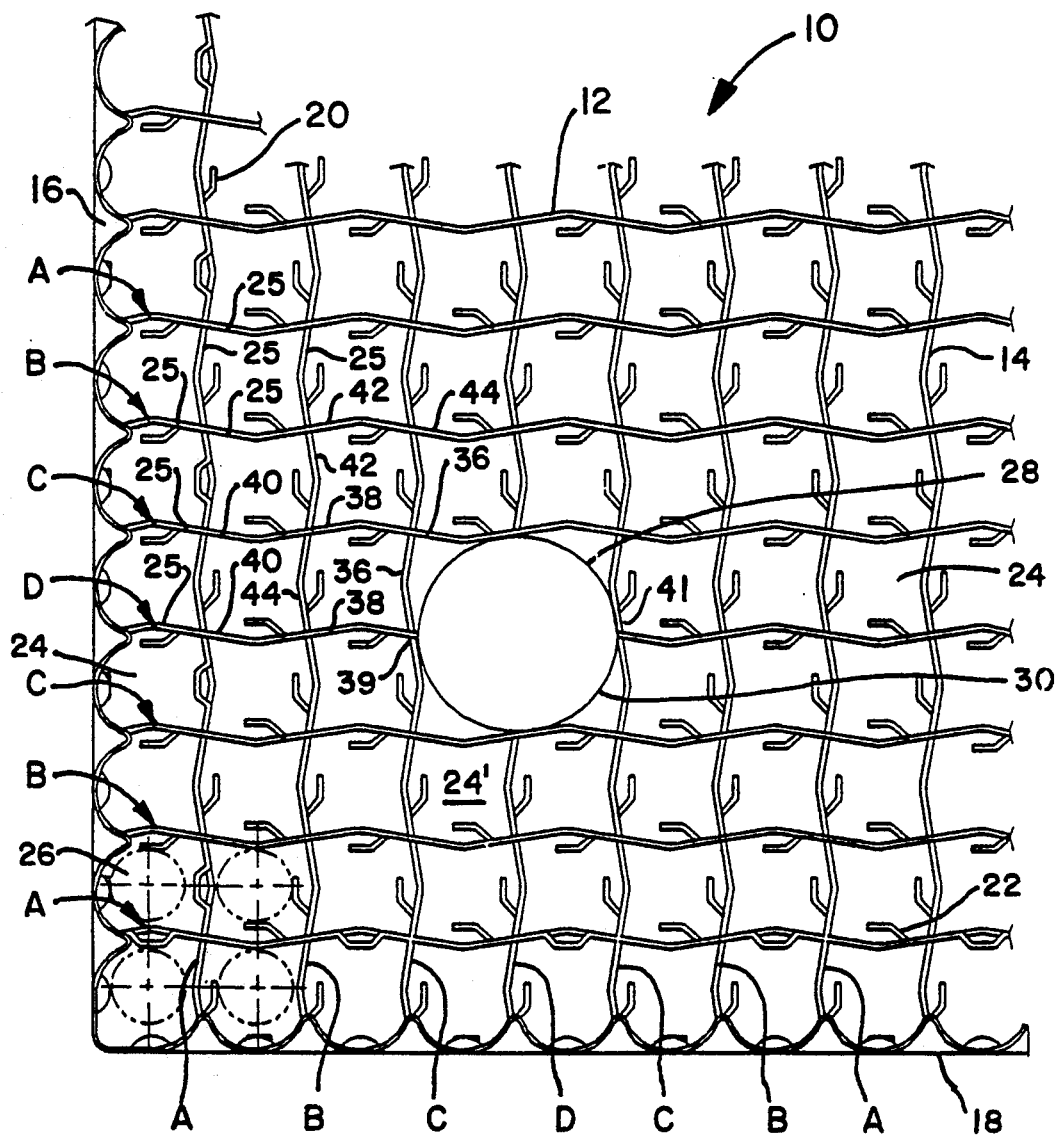
FIG. 1 is a plan view of a portion of a nuclear fuel assembly grid.

FIG. 1 is an elevation view of a portion, approximately one quadrant, of a generally rectangular nuclear fuel assembly grid 10 in accordance with a first embodiment of the present invention. The grid 10 has a plurality of substantially orthogonally intersecting grid strips such as shown at 12, which run from left to right in the Figure, and 14, which generally run up and down in the Figure. The intersecting strips form an egg-crate pattern defining a generally regular array of channels or cells. Usually, the strips are connected at their outer edges, to perimeter plates shown generally at 16 and 18, which define the envelope of the assembly as viewed in plan. The strips carry fuel support structure, such as cantilevered spring tabs 20, 22, which project into a first type of cell 24, for resiliently supporting individual fuel rods 26 in a regular array. Each of the cells 24 is sized to receive a fuel rod 26 such that each rod is spaced from an adjacent rod by a uniform distance, or pitch. Interspersed among the first type of cells 24, are a few, generally four or five, cells 28 of larger cross sectional area, through which guide or support tubes 30 traverse the length of the assembly. Each guide tube 30 is rigidly connected to the adjacent strips to form the structural framework of the assembly.

Figure 2:
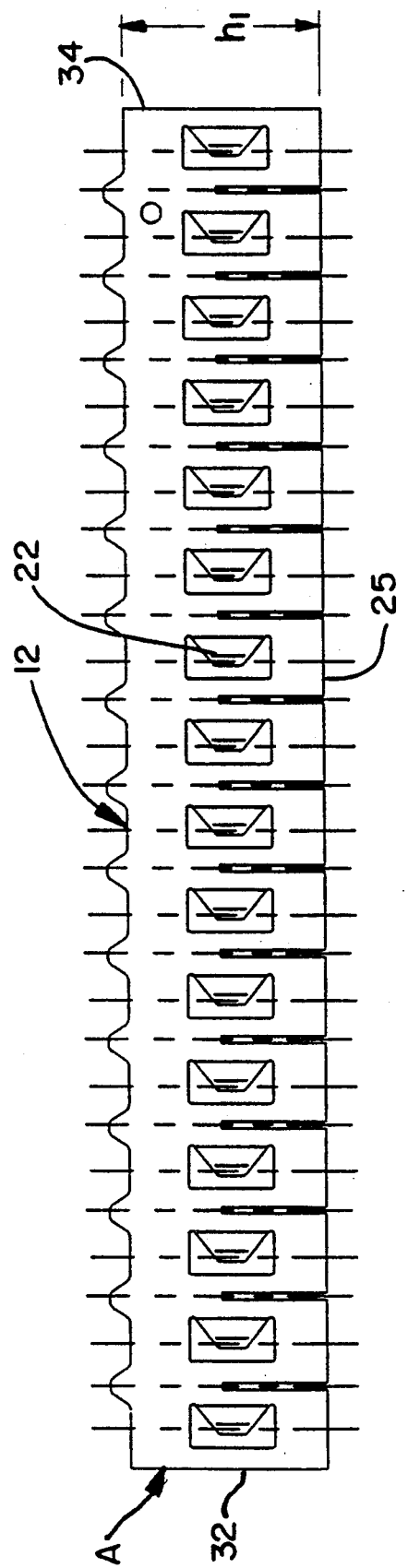
FIG. 2 is an elevation view of one type of strip (A) of the grid shown in FIG. 1.

FIG. 2 shows an elevation view of a "regular" grid strip A having a longitudinal or length dimension between side edges 32, 34, and a substantially uniform height H1. Each strip such as A has a length substantially equal to one of the sides of the envelope of the grid shown in FIG. 1. The fuel rod support structure such as cut out, cantilevered spring 22 is provided, in the present example, at sixteen substantially equally spaced positions along the length of the strip A. The substantially solid material above, below, and on either side of each spring 22 may be considered as a wall 25 associated with a respective spring. It may be appreciated upon inspection of FIG. 1, that the interlaced strips of the type shown in FIG. 2, result in each cell 24 being formed by four walls from a respective four strips. If drawn completely, the grid 10 would have a 16×16 pitch array.

In accordance With the present invention, the height dimension of each strip that defines walls of particular first and second cells 24,28, is greater at the walls of the particular second cells 28, than at the walls of at least some of the particular first cells 24. Some of the strips such as A shown in FIG. 2, can be conventional, if they are situated at least two pitch lengths from a wall of the larger, second type of cells.

Figure 3:
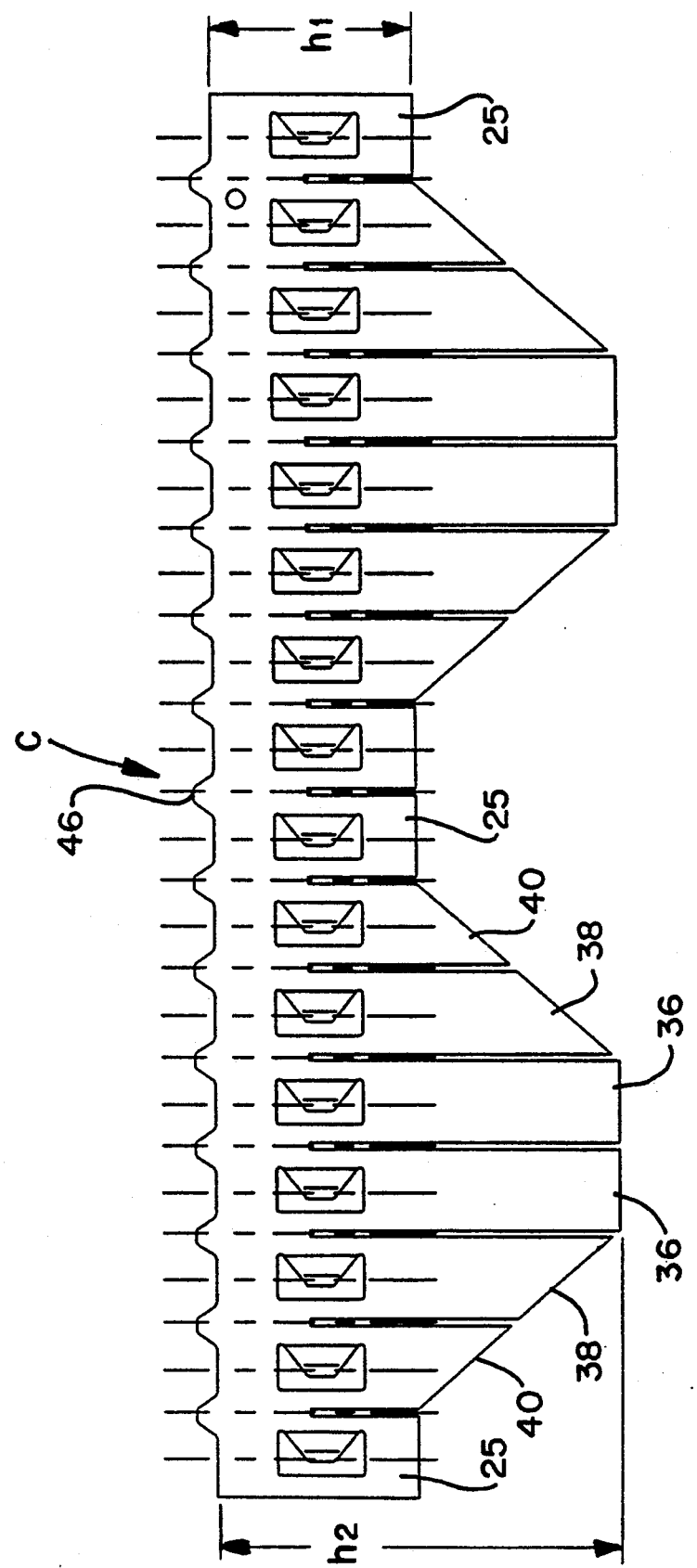
FIG. 3 is an elevation view of another type of strip (C) of the grid shown in FIG. 1.
Figure 4C:
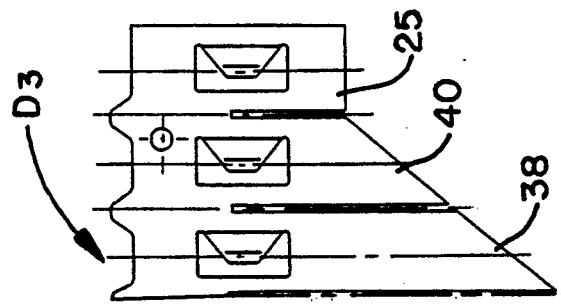
FIGS. 4(a)–(c) are elevation views of portions of another type of strip (D) of the grid shown in FIG. 1.
Figure 4B:
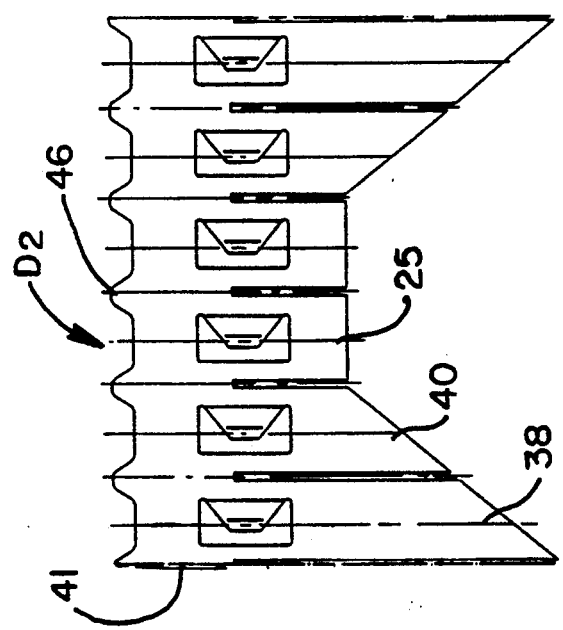
Figure 4A:
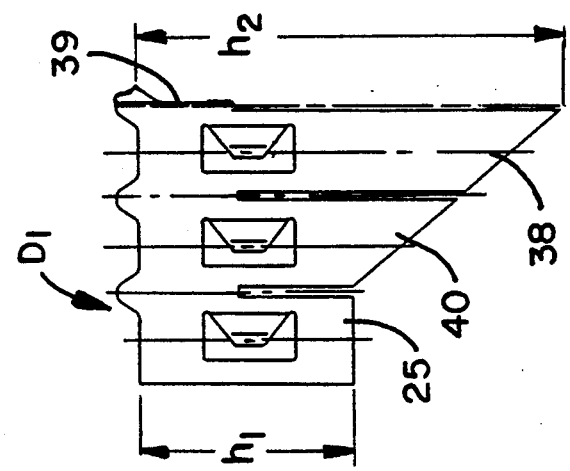
Figure 5:
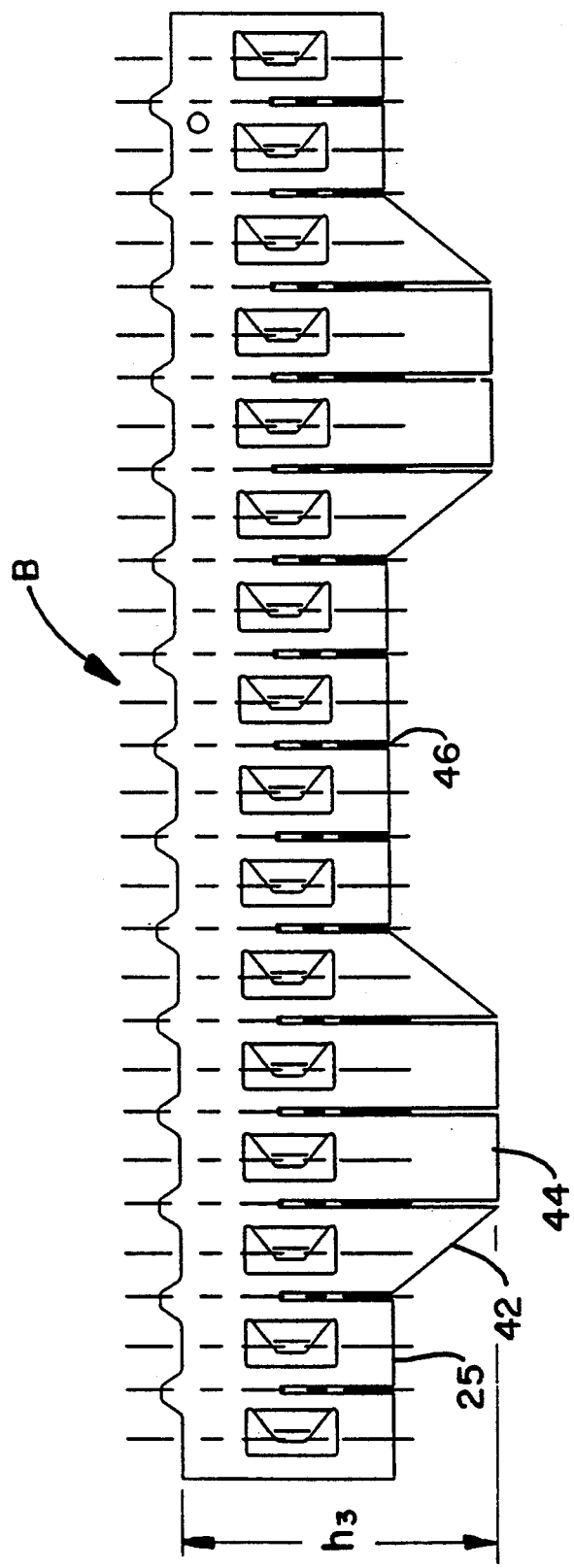
FIG. 5 is an elevation view of another type of strip (B) of the grid shown in FIG. 1.

FIGS. 3 through 5 show three basic types of other strips C, D and B respectively, which in part either form or are located within one pitch length of, the second type of cell 28. In FIG. 3, the basic height dimension and width dimension of the strip is the same as that of the A strip shown in FIG. 2. Thus, the walls at either lateral end and the two innermost walls are similar to walls 25 in FIG. 2. The walls 36 defining the second cell 28 have a height H2 that is substantially "taller". The wall 38 in the adjacent cell is slightly "shorter" but between H1 and H2, and cell wall 40, which is twice removed from second cell 28, is increasingly shorter, thereby providing a substantially continuous transition of decreasing wall height H2 to H1 from the second cell 28 to the center 46 of the grid strip. Thus, the C type of grid preferably includes two areas of increased height that would provide the walls 36 of a second type of cell 28.

FIG. 4 shows the preferred shape of the grid strips which "pass through" the center of the second type of cell 28. This "D" type of strip has three segments, D1, D2, and D3. As shown in FIG. 4(a), the outermost wall adjacent the perimeter strip 16, has the same height H1 as the strip A. The transition walls from the second type of cell toward the periphery, are of a type 38, 40 similar to the corresponding structure shown in FIG. 3. The right side edge 39 of the segment D1 shown in FIG. 4(a) would be welded to a C strip at the outside surface of the juncture of adjacent second type of wall cell 36 as shown in FIG. 1.

Another segment D2, as shown in FIG. 4(b) spans the distance between two of the second type of cells, and includes transition walls 38,40 to wall 24 similar to the corresponding transition of walls 38 and 40 to the grid center 46, as shown in FIG. 3. Segment D2 is attached at edge 41 to another C strip as shown in FIG. 1. The third segment D3 as shown in FIG. 4(c) is a mirror image of the segment D1 shown in FIG. 4(a).

The total number of cell walls defined by segments D1, D2, ad D3, is twelve. When the two cell pitches per second type of cell 28 situated in the grid between segments D1 and D2, and between D2 and D3, are taken into account the total of sixteen pitch cells is provided.

FIG. 5 shows another type of grid strip B, which is generally once cell pitch removed from the C type of strip. It can be seen that the height H3 of the tallest wall 44 in this type of grid, is shorter than wall 36 of grid type C shown in FIG. 3, and is substantially equivalent in length to the average height of wall 38 shown in FIGS. 3 and 4. Adjacent wall 42 is substantially similar to wall 40 shown in FIGS. 3 and 4. In the B type strip, half the walls 24 are of regular height H1, whereas half have an additional height.

It should be appreciated that, preferably, all the peripheral cells, i.e., those which border the perimeter plates 16,18, and those at the center of the grid, should have four walls 25, of regular height H1. In other words, the second type of cells 28 are normally situated interiorly of the grid, typically at least two pitch lengths from the perimeter plate 16,18. Preferably, in accordance with the invention, each strip D that orthogonally intersects a wall 36 of a second cell 28, has a height dimension H2 at the intersection that is substantially equal to the height of the wall of the second cell. With the particular strips shown in FIGS. 1-5, at least two walls 38,40 of each first cell 24 that is continuous to a second cell 28, have a height dimension that is greater than the height H1 of the walls on the peripheral cells. Each wall of each cell formed by a strip, extends vertically along its height dimension, i.e., the walls are not bent over into the flow area of the channel.

It should be appreciated further that the utilization of the various types of strips A–D as described above, produces an array of cells or channels in the grid, which can range from the standard channel height of the peripheral cells, to a channel height that is substantially twice as long, for the second cells. Preferably, the average channel height of every type of first cell 24' that borders on a second cell 28, is intermediate the channel heights of the second cell 28 and the peripheral cells 24.

The concept of the present invention affords great flexibility in the passive control of flow rates and flow mixing through a nuclear fuel assembly grid, in accordance with the designer's choice of wall or channel heights for the second cell 28 and the adjacent first cells 24'. In general, however, no more than 50% of all the walls in the grid should have enhanced height i.e., greater than H1.

Figure 6:
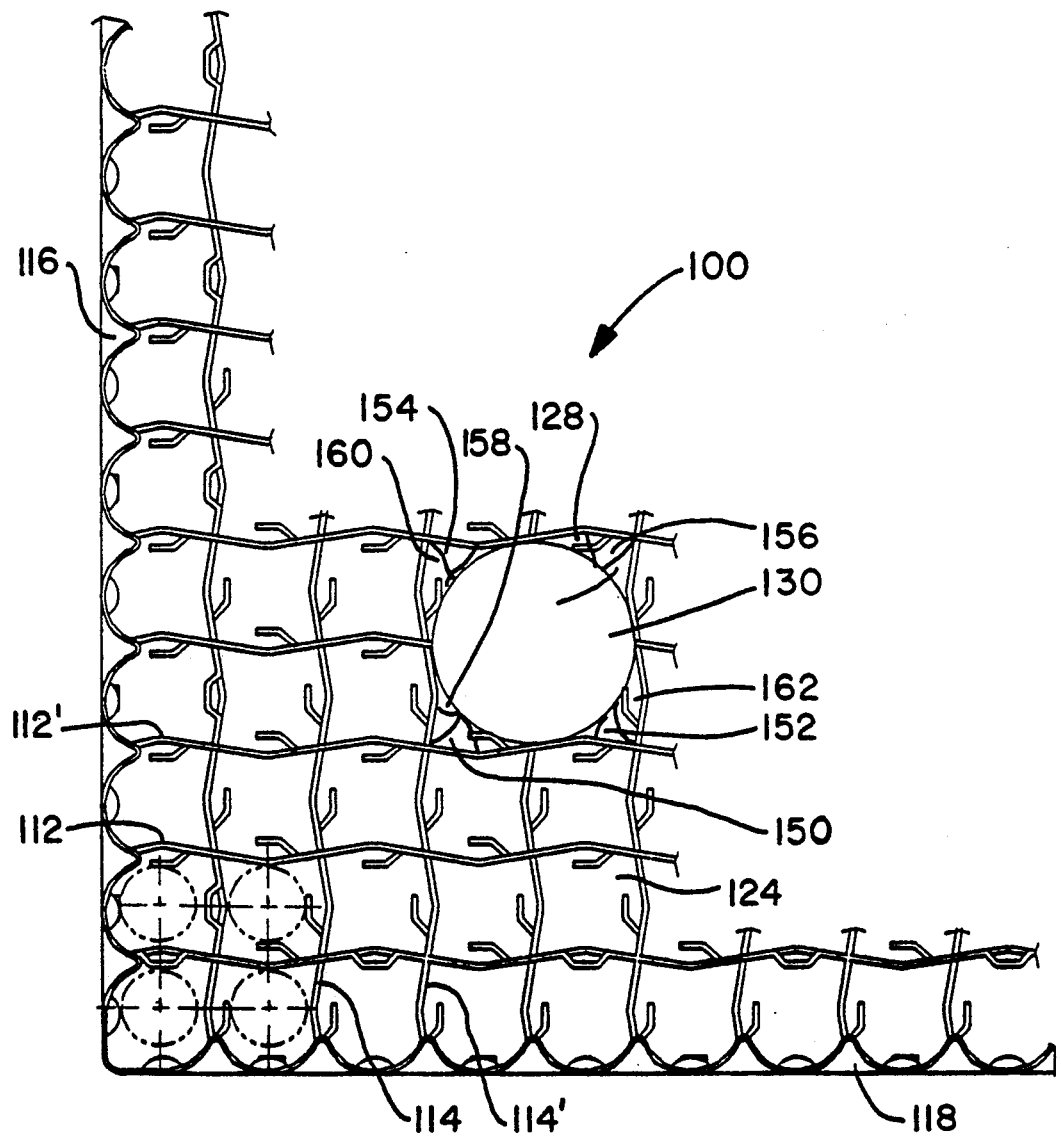
FIG. 6 is a plan view of a portion of another grid in accordance with a second embodiment of the invention.

FIGS. 6 and 7 show a second embodiment 100 of the invention, in which a similar flow-restricting effect is achieved in the second cells 128, thereby beneficially redistributing flow across the grid. In the second embodiment 100, most of the strips 112,114, are conventional (i.e., the type A shown in FIG. 2). The strips 112 which include portions defining a wall of the second cell 128, have particularized structure for restricting flow. Although the strips 112 have the same length and height dimensions as a conventional strip, the walls which form the second cells, are slit, preferably at the bottom edge, so that a portion of the wall 150,152, can be bent inwardly into the second cell (toward the guide tube 130), thereby restricting flow. It is thus possible to include a total of eight bent restrictor tabs into the second cell, as shown at 154,160, in the upper left corner, 156,164, in the upper right corner, 150,158, in the lower-left corner, and 152,162, in the lower right corner, of the second cell 128, shown in FIG. 6. In this embodiment, all of the first type of cells 124, have cell walls that are of the same height.

It can thus be appreciated that the present invention provides at least two ways of incorporating within the grid strips themselves, structure which influences the flow resistance and increases flow mixing in a non-homogeneous manner throughout the grid, so as to compensate for the non-homogeneous flow pattern produced in conventional grids.

I claim:

1. In a substantially rectangular grid for a nuclear fuel assembly of the type having a plurality of orthogonally intersecting strips forming an egg-crate pattern defining a first plurality of four-walled first cells for receiving and supporting respective fuel rods at a predetermined rod-to-rod pitch, and a second plurality of four-walled second cells that are larger in cross sectional area than and interspersed among the first cells, for receiving respective guide tubes which are attached to the walls of the second cells, each of the strips having a width dimension substantially equal to one of the sides of the rectangle and a height dimension parallel to the guide tubes, wherein the improvement comprises the height dimension of each strip that defines walls of particular first and second cells is greater at the walls of the particular second cells and each particular first cell contiguous to said particular second cells, than at the walls of other of the particular first cells.

2. The improved grid of claim 1, wherein each strip that orthogonally intersects a wall of a second cell, has a height dimension at the intersection that is substantially equal to the height of the wall of said second cell.

3. The improved grid of claim 1, wherein said other particular first cells include peripheral cells which are located at the perimeter of the grid and central cells which are at the center of the grid.

4. The improved grid of claim 3, wherein said other particular first cells include first cells that are contiguous to the peripheral cells.

5. The improved grid of claim 3, wherein at least three walls of each first cell that is contiguous to a second cell, have a height dimension that is greater than the height of the walls on the peripheral cells.

6. In an elongated nuclear fuel assembly for placement in a reactor core where coolant will flow longitudinally through the assembly, the assembly including a plurality of longitudinally spaced apart, substantially rectangular grids of the type having a plurality of orthogonally intersecting strips forming an egg-crate pattern defining a plurality of four-walled first cells for receiving and supporting respective fuel rods at a predetermined rod-to-rod pitch, and a second plurality of four-walled second cells interspersed among the first cells, for receiving respective guide tubes which are attached to the walls of the second cells, each of the strips having a width dimension substantially equal to one of the sides of the rectangle and a height dimension parallel to the guide tubes, wherein the improvement comprises the height dimension of some of the strips varying along the width dimension of the strip so as to define walls on second cells that are greater in height than walls on first cells, the walls of all cells formed by said strips extending only vertically along the strip height dimension at each cell.

7. The improved fuel assembly of claim 6, wherein the walls of the second cells have a greater height dimension than the walls of most of the first cells.

8. The improved fuel assembly of claim 7, wherein at least about 50 percent of the walls of the first cells are the same height and less than the height of the walls of the second cells.

* * * * *